United States Patent [19]

Aubele et al.

[11] Patent Number: 4,758,720
[45] Date of Patent: Jul. 19, 1988

[54] METHOD AND MEANS FOR MEASURING GUIDANCE ERRORS AT ONE OR MORE POINTS ALONG THE LENGTH OF A DISPLACEMENT-MEASURING SYSTEM

[75] Inventors: Karl-Eugen Aubele, Gussenstadt; Helmut Lenhof, Steinheim; Peter Vogt, Heidenheim, all of Fed. Rep. of Germany

[73] Assignee: Carl-Zeiss-Stiftung, Heidenheim/Brenz, Oberkochen, Fed. Rep. of Germany

[21] Appl. No.: 932,283

[22] Filed: Nov. 19, 1986

[30] Foreign Application Priority Data

Dec. 2, 1985 [DE] Fed. Rep. of Germany ....... 3542514

[51] Int. Cl.[4] .................................. H01J 40/14
[52] U.S. Cl. .................................. 250/237 G; 356/375
[58] Field of Search .................. 33/125 A, 125 C; 250/237 G, 237 R, 231 SE, 548, 557; 356/395, 373, 374, 375; 340/347 P; 346/400

[56] References Cited

U.S. PATENT DOCUMENTS

| | | | |
|---|---|---|---|
| 4,301,363 | 11/1981 | Suzuki et al. | 250/216 |
| 4,465,373 | 8/1984 | Tamaki et al. | 356/374 |
| 4,519,140 | 5/1985 | Schmitt | 33/125 C |
| 4,579,453 | 4/1986 | Makita | 356/375 |
| 4,611,122 | 9/1986 | Nakano et al. | 250/548 |
| 4,645,925 | 2/1987 | Schmitt | 250/237 G |

Primary Examiner—David C. Nelms
Assistant Examiner—Jessica L. Ruoff
Attorney, Agent, or Firm—Hopgood, Calimafde, Kalil, Blaustein & Judlowe

[57] ABSTRACT

In order to initiate the operation of an incremental-correction measurement system, which measures such guidance errors as instantaneous lateral offset of a movable machine part with respect to its guidance direction (Y), a reference mark is provided by two cylindrical lenses (4, 5) which are arranged at an angle to each other and to the guidance direction. Since the distance intercepts for Y-direction scanning of and between the two cylindrical lenses is dependent on the instantaneous lateral offset ($\Delta X$) of the guided part, it is possible to determine the absolute offset values ($\Delta X_1$, $\Delta X_2$) of two spaced incremental-correction measurement systems (K1, K2), using pairs of pulses ($A_i$, $B_i$) generated by two signal transmitters (KNIP1, KNIP2) upon their scanning traverse of the respective cylindrical lenses in the course of a single calibration run.

9 Claims, 3 Drawing Sheets

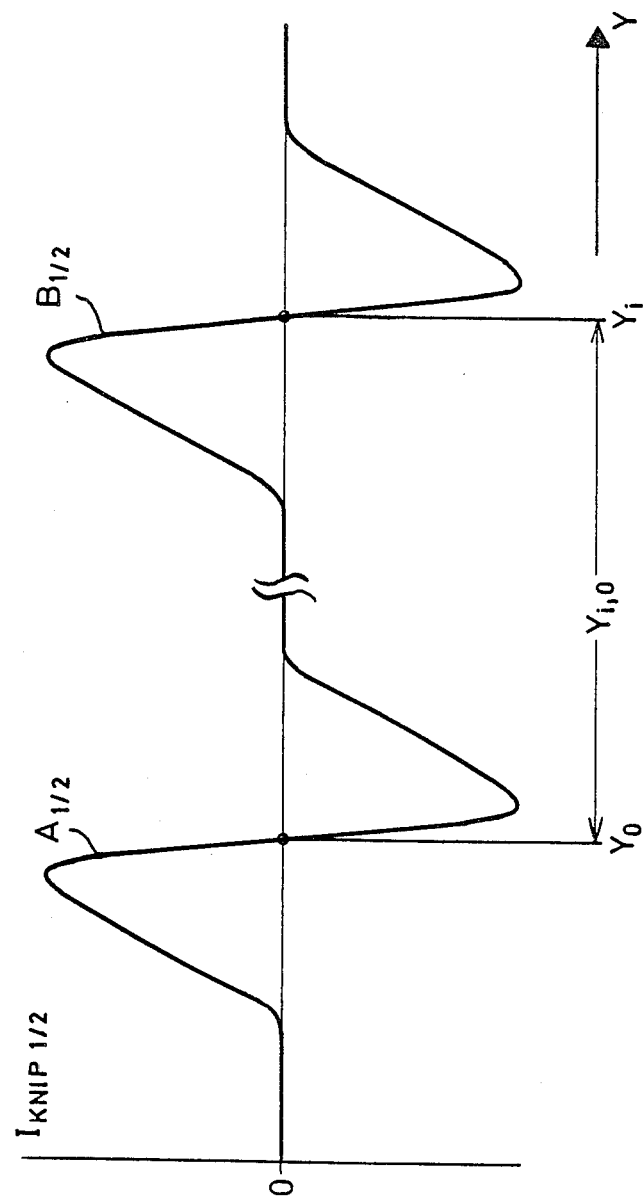

METHOD AND MEANS FOR MEASURING GUIDANCE ERRORS AT ONE OR MORE POINTS ALONG THE LENGTH OF A DISPLACEMENT-MEASURING SYSTEM

BACKGROUND OF THE INVENTION

The present invention relates to a path-measuring device for moving machine parts which has an incremental correction-measurement system for the determination of such guidance errors as offset and tilt of the machine part, as well as to a method of determining the zero position and initial values of the guidance errors.

A path-measuring device of this type is described in European Pat. No. A2-0 082 441. The known path-measuring device has a scale on which, in addition to the scale graduation for measuring displacement in the direction of guidance, there is also at least one additional incremental graduation in the form of a plurality of lines which extend over the entire guidance length. These lines are scanned by two photoelectric signal transmitters or reading heads which are staggered in the direction of guidance, the mean value of the signals of the two transmitters serving to determine offset perpendicular to the direction of guidance, and the difference between the signals serving to determine the angle of tilt of the guided part.

Since this measuring device utilizes an incrementally operating system, it is necessary, at least whenever the measuring device is placed in operation and preferably also during operation, to move to reference points at regular intervals, and to use these reference points to initiate the measurement system with absolute values. For incremental-length measurement systems, it it known, e.g., from West German C No. 3,334,400, to provide reference marks in the form of a plurality of stripes on the scale alongside the longitudinal graduations. These reference marks make possible only the fixing of one reference point, such as the zero point of the measurement device in the direction of guidance. To determine initial values of offset perpendicular to the direction of guidance and of tilt or oblique position of the machine part, the known scales provided with such reference marks are not suitable. To initiate an incremental correction measurement system therefore requires additional measures, which involve special difficulties, since, as a rule, it is not readily possible to offset or tilt the machine part by a specific amount prependicular to its direction of guidance.

BRIEF STATEMENT OF THE INVENTION

The object of the present invention is to develop a path-measuring device with an incremental-correction track in such a manner that one can initiate, as simply as possible and in a minimum amount of time, not only the system for measuring position in the direction of guidance but also the system for correction measurement.

The invention achieves this object, for a preferred embodiment wherein a movable part of the machine is longitudinal guided and measured, by additional provision of a reference mark consisting of line structure oblique to the guidance direction and scanned by fixedly spaced reading heads on the movable part. The aligned symmetry of reading-head component orientation on the movable part, in relation to a fixed line-structure orientation of the scanned part of the machine frame, gives rise to an algebraic expression from which correction-measurement data are directly available upon making an initial reading-head scan of the reference mark.

The path-measuring device of the invention makes it possible to initiate both the length-measurement system and the correction-measurement system during the course of a single calibration run. This result is obtained by scanning a reference-mark structure for which measured length, within the visual field of the signal transmitter (or reading head) and in the direction of guidance, is dependent on the instantaneous lateral offset of the guided movable part. Illustratively, such a structure can be obtained by two straight lines at an angle to each other alongside the correction track.

It is advantageous to form the reference-mark structure from two cylindrical lenses arranged on a reflective surface of the measurement scale, one of these lenses being arranged perpendicular to the direction of guidance and the other at an angle of preferably 45° thereto. With these cylindrical lenses, it is possible to produce a unidimensional, i.e., line-shaped, image of, for example, a light-emitting diode on a difference diode via which zero pulses are produced for initiating the measurement and the correction systems. No other structural parts are needed, beyond (1) the two last-mentioned diode components, which are combined to form one or two transmitters which are suitably mounted to the movable machine part, and (2) the cylindrical lenses applied on the fixed measurement scale. Two such transmitters are required if, yaw, i.e., the instantaneous oblique orientation of the guided part, is also to be ascertained, i.e., in addition to the guidance-offset error.

DETAILED DESCRIPTION

The invention will be described in detail for a preferred embodiment, in conjunction with the accompanying drawings, in which:

FIG. 4 graphically shows the variation of an electrical output signal developed as a function of travel over the reference marks of FIGS. 2 and 3.

Figure 1:
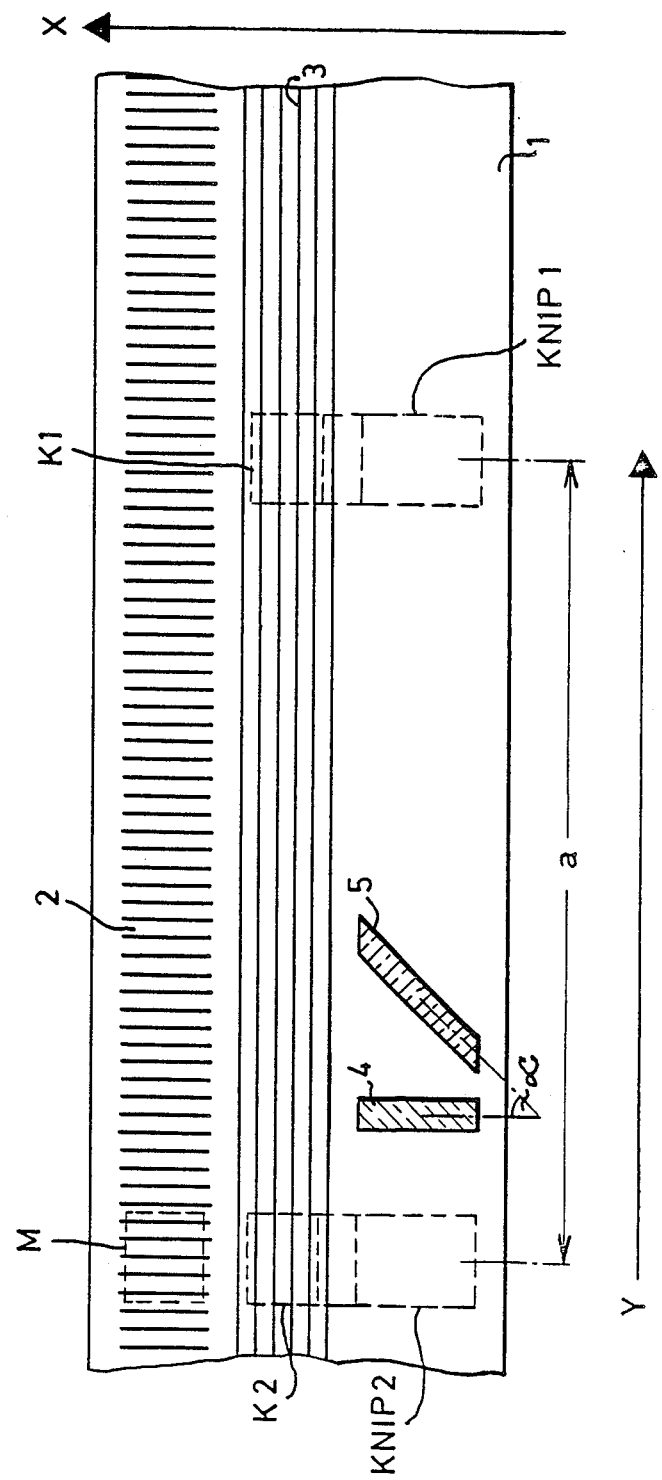
FIG. 1 is a fragmentary plan view of the scale of an incremental path-measuring system having provision for correction graduation in accordance with the invention.

In FIG. 1, the scale 1 of a path-measuring device for a movable machine part carries first incremental divisions 2 which are photoelectrically scanned by a signal generator or reading head M, not shown in detail. Output signals from the head M supply measurement values for movement of the machine part in the direction Y of its guides.

Alongside the scale divisions (2) is a correction track 3 consisting of plural parallel lines extending over the entire length of guidance. In a manner similar to the scanning of scale divisions 2, the lines of correction track 3 are scanned by two signal generators or reading heads K1 and K2 which are secured to the movable machine part at a fixed longitudinal spacing a. Signals from the heads K1 and K2 provide, after formation of the mean value or difference between their output signals, correction values for an offset X of the machine part perpendicular to its direction of guidance; and these signals make it possible to determine the instantaneous inclination or yaw of the guided machine part about the vertical or Z-axis, which extends perpendicular to the plane of the drawing, as shown in European Pat. No. A2-0 082 441.

It will be understood that circuitry associated with the photoelectric devices M, K1 and K2 includes electronic interpolators by which to effect multiple subdivision of the increments represented by line-to-line spacing, to thereby increase the resolution of path measurement. These devices are known structural components, which need not be further described.

Alongside the correction track 3 and on an otherwise-unmarked reflective area of the surface of scale 1, a reference mark is provided, consisting of two plano-convex cylindrical lenses 4 and 5. The cylindrical lens 4 is mounted perpendicular to the Y-direction of guidance, while the cylindrical lens 5 is mounted with its axis inclined at an angle of 45° to the axis of the cylindrical lens 4. To scan the reference mark, which consists of these two cylindrical lenses, two zero-pulse transmitters KNIP1 and KNIP2 are mounted to the movable machine part at the fixed separation distance a. These transmitters supply zero-correction pulses for initiating the correction-measurement systems K1 and K2 and for the length-measurement system M proper.

Figure 2:
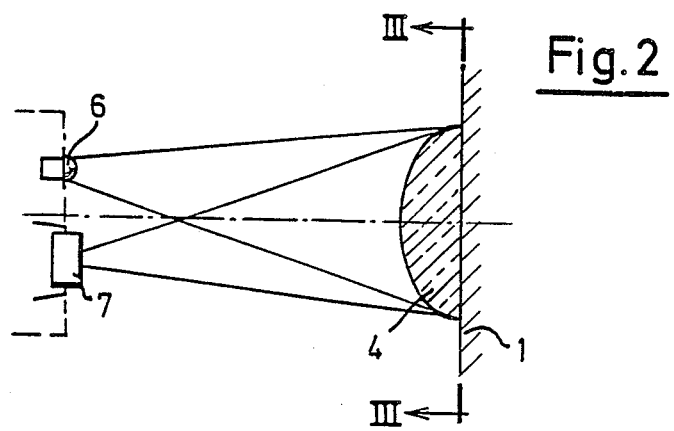
FIG. 2 is a simplified optical diagram which shows diagrammatically, in cross section, the scanning of a reference mark (4/5) on the scale of FIG. 1.

Before taking up the sequence of measures necessary to initiate a measurement, the construction of transmitters KNIP1 and KNIP2 will be briefly described by reference to FIGS. 2 and 3; each transmitter contains a light transmitter in the form of a light-emitting diode 6 and an adjacent photosensor in the form of a difference diode 7. Their distance from the cylindrical lenses on scale 1 and lens-refractive power are so selected that the punctiform light-emitting surface of the light-emitting diode 6 is imaged as a unidimensional band of light in the response plane of the difference diode 7.

Figure 3:
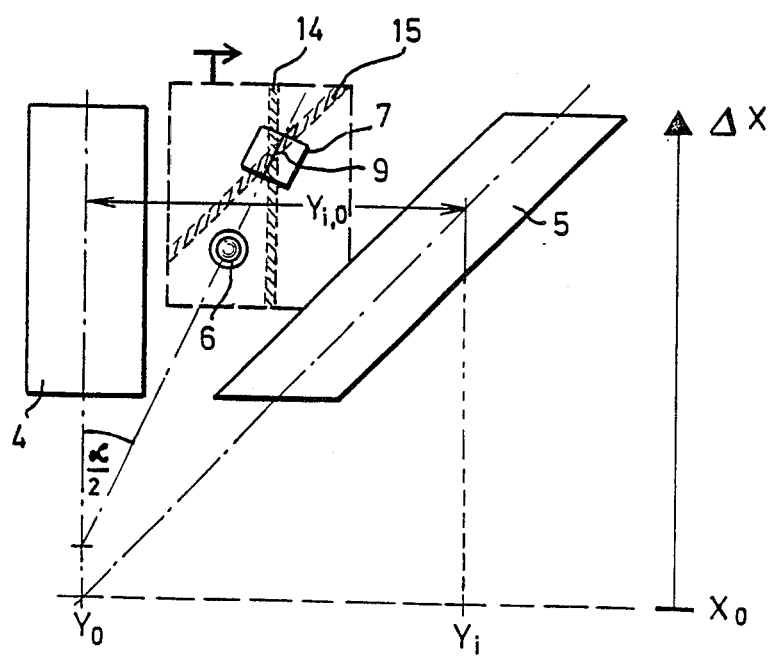
FIG. 3 is a view of reference marks and signal transmitter along the line III/III of the diagram of FIG. 2.

As shown in FIG. 3, the light-emitting diode 6 is on the response alignment (or division line) 9 of the difference diode 7, and the alignment 9 is fixed at an angle $\alpha/2$ of 22.5° to the X-axis and therefore symmetrically between the respective orientations of the two cylindrical lenses 4, 5. This arrangement has the advantage that signals developed by the difference diode are characterized by the same shape and intensity for any scanning traverse of reference-mark lenses 4, 5.

To initiate operation of the measurement system M and of the correction-measurement systems K1 and K2, the movable machine part is so moved in its guided direction Y that both signal transmitters KNIP1 and KNIP2 pass over the cylindrical lenses 4 and 5. As soon as the transmitter KNIP1 moves over the cylindrical lens 4, i.e., when, in that connection, the light band, designated 14 in FIG. 3, moves over the difference diode 7 of KNIP1, the latter gives off the signal designated $A_{1/2}$ in FIG. 4. This signal is immediately usable and is therefore used to initiate operation of the measurement system M which scans the longitudinal scale track 2. In this connection, the value $Y_o$ is ascribed to the position signal which the measurement system M supplies and which is immediately available. As soon as the cylindrical lens (5) has been traversed, and its light band 15 has been scanned by the difference diode 7, a second signal $B_{1/2}$ is produced. The position $Y_i$ at which this second signal occurs is a function of such offset as may currently exist in the X-direction, i.e., perpendicular to the guidance direction Y of the measurement systems KNIP1 and K1 and of the machine part to which these measurement systems are mounted.

As can be easily noted from the conditions sketched in FIG. 3, there exists the relationship:

$$\Delta X_1 = X_o + b \cdot (Y_i - Y_o) \qquad (1)$$

wherein $\Delta X_1$ is the ascertained existing offset; the correction-measurement system K1 is initiated with this value;

$Y_o$ is a reference point of the path-measuring system M;

$X_o$ is a reference point for the correction-measurement systems K1 and K2;

b is the tangent of the angle between the axes of the cylindrical lenses 4 and 5; this value is a machine constant which need be determined only once, after attachment of the cylindrical lenses.

Next, zero-pulse transmitter KNIP2 then similarly traverses the cylindrical lenses 4 and 5, and once again two signals of the shape shown in FIG. 4 are produced.

The measurement systems K1, and in the same way also the measurement system K2, can now be initiated in such manner that the increments and interpolation values of the path measurement system which occur between the two signals $A_{1/2}$ and $B_{1/2}$ of the correction zero-pulse transmitters KNIP1 and KNIP2 are counted and further processed, for example, by an electronic computer, using Equation 1. When the two measurement systems K1 and K2 have been initiated, not only is the offset of the movable machine part perpendicular to the guide determined as an absolute value but there is also an absolute determination of the angle $\gamma$ by which the machine part is rotated or tilted in the plane of the axes X and Y, i.e., about the vertical or third axis Z. The value $D_Z$ for this guidance error is immediately obtained by taking the difference between the respective initially determined offset values $\Delta X_1$ and $\Delta X_2$ of the measurement systems K1 and K2, with due allowance for the measured correction value $\Delta k_{1,2}$, namely, the measurement initiated by the first-initiated measurement system K1 and occurring in the time between initiation of the two measurement systems K1 and K2. This guidance error value is given by the expression:

$$D_Z = \tan \gamma = \frac{a}{\Delta X_1 + \Delta k_{1,2} - \Delta X_2} \qquad (2)$$

It will thus be seen that offset, inclination and position of a machine equipped with the described path-measurement system are all determined in the course of a single calibration run in the guidance direction.

In the embodiments shown, the reference mark for initiating operations consists of two cylindrical lenses. However, it is clear that instead of the cylindrical lenses one could also use line figures arranged at an angle to each other as the reference mark, said figures then being scanned by a photoelectric system such as contained by the reading heads or transmitters M, K1 and K2.

What is claimed is:

1. A displacement-measuring device for a movably guided machine part wherein an incremental correction-measurement system (3, K1, K2) is provided for the determination of guidance errors such as lateral offset or tilt (yaw) of the machine part with respect to the guidance direction (Y), characterized by the fact that the correction-measurement system contains at least one reference-mark structure comprising two straight lines which are inclined to each other and to the guidance direction, said straight lines being in spaced proximity to each other for their successively scanned recognition in the course of guided movement of the machine part, and a signal transmitter and reading head for scanning said structure in the course of guided movement in the Y direction.

2. A displacement-measuring device according to claim 1, characterized by the fact that said reference-mark structure is positioned for zero-mark pulse generation alongside measurement scale graduations (2, 3).

3. A displacement-measuring device according to claim 2, characterized by the fact that the zero-mark pulse is produced by scanning two cylindrical lenses arranged on a reflective surface, one cylindrical lens having its axis perpendicular to the guidance direction (Y) while the other cylindrical lens has its axis at an angle $\alpha$ of 45° to the guidance direction (Y).

4. A displacement-measuring device according to claim 2, characterized by the fact that the signal transmitter for reading the zero mark is mounted to the movable machine part containing a light-emitting diode (6) as a transmitter and a difference photodiode (7) as a receiver.

5. A displacement-measuring device according to claim 2, characterized by the fact that two signal transmitters are arranged at a fixed spacing (a) in the guidance direction for separate reading of the zero-pulse mark at each of the end points of the distance (a) in the course of a single pass of the machine part in the guidance direction.

6. A displacement-measuring device according to claim 2, characterized by the fact that the zero-mark pulse is produced by scanning two cylindrical lenses arranged on a reflective surface, the respective axes of said lenses having the respective inclinations of said lines, and that the signal transmitter for reading the zero mark contains a light-emitting diode as a transmitter and a difference photodiode as a receiver, said diodes being fixedly spaced from each other on an alignment which is inclined to the direction of guided movement and which is substantially at the angle of bisection between the respective inclinations of said lines.

7. A length-measuring device for a machine part guided for longitudinal displacement comprising:
    a scale extending in the direction of displacement and having an incremental graduation having a first plurality of lines parallel to said direction of displacement and extending over the length of said scale;
    scale-reading means for reading said graduation and delivering a signal indicative of guidance errors of said movable part;
    a reference-mark structure on said scale having the form of two lines which are inclined to each other and which are also inclined with respect to the parallel lines of said graduation; and
    a line-reading scanner for scanning said reference-mark structure and delivering a signal when scanning said reference-mark structure, said signal being indicative of initial offset of said machine part perpendicular to said displacement direction.

8. A method of determining position and guidance errors such as offset or tilt (yaw) of a movably guided part of a machine which has an incremental length-measuring system and an incremental-correction system for said errors; comprising the steps of
    determining the zero position ($Y_o$) for said length-measuring system and the initial values ($\Delta X_1$, $\Delta X_2$) of said guidance errors during one and the same calibration run of the movable part by using guided movement of said part to effect scanning of a reference mark consisting of two line structures, said line structures being at an angle to each other and separated by a fixed distance ($Y_i - Y_o$) which is a function of the offset ($\Delta X_1$) perpendicular to the direction of guided movement; and
    determining instantaneous guidance errors of the movable part by concurrently scanning a correction graduation of a plurality of parallel lines extending in the direction of movement.

9. A length-measuring device for a movably guided machine part comprising
    a scale extending in the direction of guidance and having a first incremental graduation for measuring displacement in said direction and having a second incremental graduation consisting of a plurality of parallel lines extending over the length of the scale and being parallel to said direction of guidance;
    first scale-reading means for reading said first scale graduation;
    second scale-reading means for reading said second graduation and producing a signal indicative of guidance errors of the movable part;
    at least one reference mark structure on said scale having the form of two lines which are inclined to each other and are also inclined with respect to the direction of guidance; and
    a line-reading scanner for reading said reference-mark structure in the course of a single direction of guided movement of said machine part.

* * * * *